July 26, 1938.  C. S. STEWART  2,125,036
PLOW
Filed Sept. 16, 1936
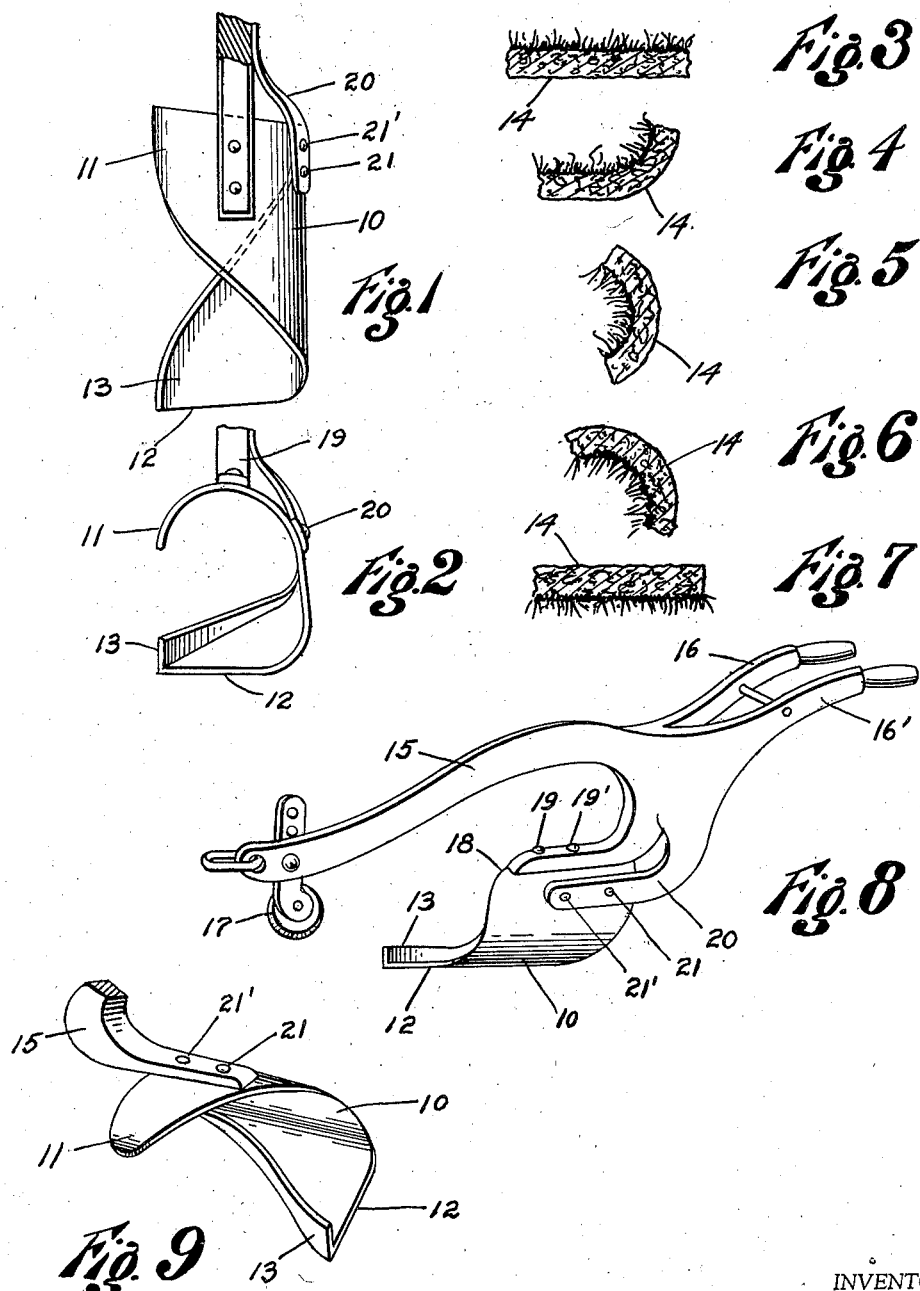
INVENTOR.
Charles Sumner Stewart
BY Christian R. Nielsen
ATTORNEY.

Patented July 26, 1938

2,125,036

UNITED STATES PATENT OFFICE 2,125,036

PLOW

Charles Sumner Stewart, Milwaukee, Wis.

Application September 16, 1936, Serial No. 101,137

5 Claims. (Cl. 97—115)

This invention relates to plows and more particularly to a type of plow for turning the top soil prior to cultivation.

An object of my invention is to provide a plow that is equipped with a spiral deflector plate to give the top soil a rotary motion while turning it completely within its own furrow.

Another object of my invention is to provide a plow that is so designed that a right and left hand plow may be attached to a beam to eliminate side draft.

It is manifest that anyone familiar with the art that a plow designed in this manner will obviously eliminate dead furrows and permit the operator to plow back and forth on the field thus providing an easier method than the conventional type of plow would provide.

Another and further object of my invention will become readily apparent to persons skilled in the art, from a consideration of the following descriptiton when taken in conjunction with the drawing wherein Fig. 1 is a perspective plan view of the mold-board of the device.

Fig. 2 is a perspective front view of the mold-board.

Figs. 3, 4, 5, 6, and 7 illustrate the manner in which the top soil is sheared from the ground and replaced in an inverted position due to the spiral action of the mold-board.

Fig. 8 is a perspective view of the closed side of the device showing a type of construction applicable for use when guided by hand, and Fig. 9 is a fragmentary perspective view of the mold-board construction showing its open side and displaying the colter.

Similar characters of reference indicate corresponding parts through the several views and referring now to the same, 10 represents a mold-board constituting the body of the device. This mold-board is of spiral design and has an overhanging deflector 11. There is a forward end 12 acting as a share or cutting edge. This end 12 is inclined rearwardly to produce a shearing effect when the device is drawn through the soil. At the open end of the share 12 is a colter 13 projecting upwardly and at right angle to the mold-board 10 following the contour of its spiral edge. This colter 13 is tapered gradually to meet the edge of said spiral mold-board, and acts as a guide in directing the path of the top soil 14 during the process of its being cut from the subsoil and placed in an inverted position in the furrow.

The share 12 enters the soil and cuts a predetermined thickness of top soil 14 from the subsoil as the top soil enters the enclosure formed by the spiral mold-board 10. While the device is drawn forward it permits the top soil 14 to be guided by the colter 13 causing the soil to creep upward on the inside of the mold-board until it reaches the lower side of the overhanging deflector 11 when it is permitted to drop in an inverted position into the furrow just cut. This manner of inverting the top soil is illustrated in the accompanying drawing by Figures 3 to 7 inclusive.

I have illustrated a conventitonal type of hand plow arrangement consisting of a plow beam 15 provided with a pair of handles 16 and 16' for use in guiding the device and a forward guide 17 consisting of an adjustable mounted roller to determine the depth of the cut. The mold-board 10 is shown mounted to the plow beam 15 at 18 by means of rivets 19 and 19' and an auxiliary support 20, shown integrally formed with the plow beam 15, is fastened to the side of the mold-board 10 by rivets 21 and 21'.

However, while I have herein described with considerable particularity a single embodiment of my invention it will be manifest that many changes in the general arrangement, form, and configuration of the structure may be made, and parts thereof may be varied within the scope of the appended claims.

In operation the device, as illustrated and described, will cause the top soil to be rotated 180° without moving sideways thereby eliminating any side pressure prevalent in the conventional type of plow. It may be used in a gang plow arrangement drawn by a tractor, or the like, and when placed in pairs of right and left hand with the spiral in opposite directions it will balance the twisting force caused by the turning of the soil. When a plurality of plows of this design is employed in a gang plow arrangement they may be placed in a parallel line at right angle to the line of travel, thereby providing a straight starting and stopping line. Dead furrows and back ridges are eliminated entirely and a field may be plowed by starting at one side and returning in a path parallel to and adjacent to the last furrow made so as to prevent the customary idle travel to the end of the field.

Having thus described my invention and the purpose for which the device is intended, what I claim and desire to secure by Letters Patent in the United States is:

1. A plow of the character described comprising a mold-board of spiral construction having an overhanging deflectory portion adapted to place the soil in an inverted position, a cutting edge at the front of said mold-board, said cutting edge angularly disposed, a colter along the open edge of said mold-board and at right angle thereto, said colter tapered gradually to meet the edge of said spiral mold-board, a plow beam to support the device, and means adjustably mounted to said plow beam to control the depth of the soil to be turned.

2. A plow of the character described comprising a plow beam, handles mounted to said plow beam for manually directing the path of said plow, a mold-board having a spiral contour, a cutting edge in the front of said mold-board, said cutting edge disposed at an angle, an overhanging deflecting portion adapted to replace the soil in an inverted position, a colter along the open edge of said mold-board extending upward at right angle thereto, said colter tapered gradually to meet the edge of said spiral mold-board, and means adjustably mounted to said plow beam to control the depth of the soil to be turned.

3. A device of the character described consisting of a mold-board of spiral design integrally formed, a beam supporting said mold-board, said mold-board provided with a cutting edge angularly disposed, an overhanging deflector, a colter bent at right angle to and along the entire open edge of said mold-board, said colter tapering gradually to meet the edge of said spiral mold-board, and means adjustably mounted on said beam to determine the depth of soil to be turned.

4. A plow consisting of a beam, a mold-board attached to said beam, said mold-board constructed of a single piece of flat metal having a horizontal base, a radial vertical wall on one side, a radial horizontal overhanging depending edge, a tapered colter at right angle to and along the entire open end of said base, a cutting edge disposed at an angle rearwardly from the open end to the vertical side wall, and means adjustably mounted to said plow beam to control the depth of the soil to be turned.

5. A plow consisting of a beam, a mold-board attached to said beam, said mold-board constructed of a single piece of metal having a spiral contour and a horizontal base, a radial vertical wall on one side, a radial horizontal overhanging depending edge, a colter at right angle to and along the entire open end of said base and radial wall, said colter tapering from the front of the mold-board along the open edge to a point in the radial overhanging edge, a cutting edge disposed at an angle rearwardly from the open end to the vertical side wall, a means adjustably mounted to said plow beam for controlling the depth of the soil to be turned.

CHARLES SUMNER STEWART.